(12) United States Patent
Zinbo et al.

(10) Patent No.: US 7,056,607 B2
(45) Date of Patent: *Jun. 6, 2006

(54) MAGNETIC RECORDING MEDIUM

(75) Inventors: Noboru Zinbo, Odawara (JP); Noriko Inoue, Odawara (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 58 days.

This patent is subject to a terminal disclaimer.

(21) Appl. No.: 10/810,656

(22) Filed: Mar. 29, 2004

(65) Prior Publication Data

US 2004/0219392 A1 Nov. 4, 2004

(30) Foreign Application Priority Data

Apr. 15, 2003 (JP) .............................. 2003-110456

(51) Int. Cl.
*G11B 57/08* (2006.01)
*G11B 5/78* (2006.01)
*G11B 3/70* (2006.01)

(52) U.S. Cl. .............................. 428/840.2; 428/840.3; 428/840.5; 360/134; 369/289

(58) Field of Classification Search ................ 428/838, 428/839.5, 840.2, 845.1, 845.2, 845.3, 900, 428/687, 323, 329, 339, 403, 694 BA, 694 B, 428/694 BH, 694 BS, 845, 840, 840.3, 840.5; 427/131; 360/134, 135; 369/275.5, 283, 369/286

See application file for complete search history.

(56) References Cited

U.S. PATENT DOCUMENTS

| | | | |
|---|---|---|---|
| 6,042,938 A | * | 3/2000 | Ikarashi et al. ............. 428/900 |
| 6,777,061 B1 | * | 8/2004 | Kitamura et al. ........ 428/840.2 |
| 6,875,495 B1 | * | 4/2005 | Harasawa et al. ........ 428/845.1 |
| 2003/0118869 A1 | * | 6/2003 | Ozawa et al. .......... 428/694 BH |
| 2004/0072030 A1 | * | 4/2004 | Lowery et al. ........ 428/694 BS |
| 2004/0076855 A1 | * | 4/2004 | Doushita et al. ...... 428/694 BA |
| 2004/0110037 A1 | * | 6/2004 | Kuse et al. ........... 428/694 BN |

OTHER PUBLICATIONS

Translation of JA 11-259851.*
Translation of JA 10-064041.*
Translation of JA 2001-101647.*

* cited by examiner

*Primary Examiner*—Stevan A. Resan
*Assistant Examiner*—Louis Falasco
(74) *Attorney, Agent, or Firm*—Sughrue Mion, PLLC

(57) ABSTRACT

Provided is a magnetic recording medium permitting the controlling of backcoat layer transfer to a magnetic layer surface, a reduction in dropout even when employing microgranular magnetic material, as well as good running stability, durability, and storage properties. The magnetic recording medium has a magnetic layer with a ferromagnetic powder and a binder on one surface of a nonmagnetic support and a backcoat layer with a nonmagnetic powder and a binder on the other surface of the nonmagnetic support. The nonmagnetic powder is an acicular particle having a mean particle diameter of 5 to 300 nm, and the backcoat layer includes water-soluble cations in a quantity of 100 ppm or less and water-soluble anions in a quantity of 150 ppm or less.

10 Claims, No Drawings

MAGNETIC RECORDING MEDIUM

FIELD OF THE INVENTION

The present invention relates to a magnetic recording medium for high-density recording, and more particularly, to a magnetic recording medium simultaneously affording running stability, durability, and a reduction in dropout.

BACKGROUND OF THE INVENTION

In the field of magnetic tapes, with the widespread use of minicomputers, personal computers, workstations, and other office computers, there has been abundant research in recent years into magnetic tapes (known as "backup tapes") for recording computer data as external memory devices. In the practical development of magnetic tapes for such applications, particularly in combination with size reduction and the increase in information processing capability in computers, there has been a strong demand for improvement in recording capacity to complement this increase in recording capacity and reduction in size.

In the past, magnetic recording media obtained by coating a magnetic layer comprised of iron oxide, Co-modified iron oxide, $CrO_2$, a ferromagnetic metal powder, and/or a hexagonal ferrite powder dispersed in a binder on a nonmagnetic support have been widely employed. Of these, microgranular ferromagnetic alloy powders and hexagonal ferrite micropowders are known to have good high-density recording characteristics. However, when employing inductive heads that have mainly employed in systems with flexible media, these ferromagnetic powders have not provided adequate output due to their low saturation magnetization. However, the use of the magnetoresistive heads (MR heads) employed on hard disks has also begun in removable recording employing such flexible media.

It is known that due to the high sensitivity of MR heads, adequate reproduction output is achieved even when the above microgranular alloy powders and hexagonal ferrite micropowders are employed and high C/N ratios are achieved due to the low noise characterizing these microgranular powders. When employing MR heads in high-density recording, the use of these microgranular ferromagnetic powders, the smoothing of a magnetic layer surface, and the thinning of a magnetic layer have been proposed to improve resolution.

It is known that a backcoat layer with protrusions is employed to improve the running properties of a magnetic recording medium having a smooth magnetic layer. However, protrusions on a backcoat layer cause pits (called "transfer") on a magnetic layer surface because the protrusions bite into the magnetic layer surface when the backcoat layer and the magnetic layer surface are superposed, resulting in the problem of decreased output. When the linear recording density is high and the track is narrow, this "transfer" results not only in decreased output, but also in lost signal.

As a means of preventing this transfer, Japanese Unexamined Patent Publication (KOKAI) Heisei No. 10-64041 discloses specifying the density of protrusions equal to or greater than 100 nm in height and employing highly rigid urethane in the magnetic layer to reduce the effect of back transfer in 8 mm video. Japanese Unexamined Patent Publication (KOKAI) No. 2000-40218 describes that a medium suited to a high-density digital recording, which exhibits good electromagnetic characteristics and low dropout as well as good running property and durability of a magnetic layer, can be provided when, in the surface profile of the magnetic layer measured by an atomic force microscope, recesses the cross section of which at 20 nm depth from the root mean square surface is 3 percent or less of the area of the reproduction bit are present by 3 or less in number per 100 $\mu m^2$.

Japanese Unexamined Patent Publication (KOKAI) Heisei Nos. 11-213377 and 11-259851 disclose a backcoat layer comprising a granular oxide and carbon black, describing that when the adhesive strength of the backcoat to an aramid base is equal to or greater than 80 g/(8 mm width), good running durability is achieved.

However, in addition to preventing transfer of the backcoat layer to the magnetic layer, there is also a need to improve running stability, durability, and storage properties in higher-density recording.

Accordingly, it is an object of the present invention to provide a magnetic recording medium permitting the controlling of backcoat layer transfer to a magnetic layer surface, a reduction in dropout even when employing microgranular magnetic material, as well as good running stability, durability, and storage properties.

SUMMARY OF THE INVENTION

The present inventors conducted extensive research to achieve the aforementioned object, resulting in the discovery that it was possible to improve storage properties and thus reduce dropout by controlling the quantity of water-soluble ions contained in the backcoat layer; the present invention was devised on that basis.

That is, the aforementioned object is achieved by:

a magnetic recording medium comprising a magnetic layer comprising a ferromagnetic powder and a binder on one surface of a nonmagnetic support and a backcoat layer comprising a nonmagnetic powder and a binder on the other surface of the nonmagnetic support, wherein said nonmagnetic powder is an acicular particle having a mean particle diameter ranging from 5 to 300 nm, and said backcoat layer comprises water-soluble cations in a quantity equal to or less than 100 ppm and water-soluble anions in a quantity equal to or less than 150 ppm.

The present invention is described in greater detail below.

[Backcoat Layer]

In the magnetic recording medium of the present invention, the backcoat layer comprises a nonmagnetic powder in the form of an acicular particle having a mean particle diameter ranging from 5 to 300 nm. Here, the "mean particle diameter" of acicular particles means an average value of the greatest diameter of the acicular particles, that is, the mean major axis length. The mean particle diameter of the acicular particle ranges from 5 to 300 nm, preferably from 5 to 250 nm, and more preferably from 10 to 200 nm.

Conventionally, carbon black and granular oxides have been incorporated as the main components in the backcoat layer. However, a backcoat layer comprising such main components lacks strength. Further, due to inadequate dispersion of nonmagnetic powders contained in the backcoat layer, large protrusions are present on the surface. When the protrusions present on the backcoat layer surface are transferred to the magnetic layer, they compromise the surface smoothness of the magnetic layer, resulting in problems such as poor electromagnetic characteristics and poor running durability.

In the present invention, an acicular particle is incorporated into the backcoat layer and the acicular particle and carbon black are dispersed to a high degree, making it possible to control transfer to the magnetic layer. Further, in the present invention, by employing an acicular particle in the backcoat layer, it is possible to achieve higher medium strength and higher durability than the case when granular particles are employed in the backcoat layer.

When the mean particle diameter of the acicular particles employed in the backcoat layer is less than 5 nm, they tend to aggregate, dispersion becomes difficult, large protrusions appear on the surface of the backcoat layer, and these are transferred to the magnetic layer. Further, when the mean particle diameter of the acicular particles is less than 5 nm, with the reduction in size of the particles, it becomes necessary to increase the amount of binder to achieve high coating strength. The increase in the amount of binder results in a problem in the form of an increase in surface resistivity Rs. When the mean particle diameter of the acicular particles exceeds 300 nm, there is a problem in the form of increased surface roughness of the backcoat layer.

The acicular ratio of the acicular particles preferably ranges from 2 to 20, more preferably from 3 to 10. When the acicular ratio is within this range, it is possible to simultaneously achieve both thinning and smoothening of the backcoat layer. The acicular ratio within a range of 2 to 20 is also desirable to achieve a backcoat layer having a high fill ratio and affording coating strength.

The size of the acicular particle is preferably 5 to 100 percent, more preferably 5 to 70 percent, of the thickness of the backcoat layer, and the standard deviation $\sigma$ in the primary particle size of the acicular particle is preferably equal to or less than 30 percent, more preferably equal to or less than 25 percent, of the mean particle diameter. When the size of the acicular particle falls within the range of 5 to 100 percent, preferably 5 to 70 percent, of the thickness of the backcoat layer, a backcoat layer with good dispersibility, surface smoothness, and coating strength is obtained. When the standard deviation $\sigma$ of the primary particle size is equal to or less than 30 percent of the mean particle diameter, more uniform dispersion and coating strength are achieved.

Acicular particles that meet the aforementioned particle size and size distribution requirements can be comprised in the backcoat layer. Examples of the acicular particles include alumina, silica, chromium oxide, $\alpha$-iron oxide, and other metal oxides; calcium carbonate, barium sulfate, and other salts; melamine, benzoguanamine, and other resin particles; and carbon black particles. It is possible to improve strength and durability by adding hard inorganic powders with a Mohs' hardness of 5 to 9 as the acicular particle. The acicular particle is preferably an oxide because it is chemically stable in an atmosphere and easy to handle during production.

Carbon black, preferably electrically conductive carbon black, is desirably contained in the backcoat layer in the magnetic recording medium of the present invention. Electrically conductive carbon black improves the conductivity of the backcoat layer, prevents running failure due to charging, plays a role as a cushioning agent, and reduces the biting of protrusions present on the backcoat layer surface into the magnetic layer. The mean primary particle size of the carbon black contained in the backcoat layer preferably ranges from 10 to 150 nm. The use of a carbon black of uniform particle distribution and cluster size distribution results in protrusions of uniform height being present on the surface of the backcoat layer. When the mean primary particle size of the carbon black contained in the backcoat layer falls within the aforementioned range, a backcoat layer having good surface smoothness, high coating strength, and low surface resistivity is obtained.

In the backcoat, the weight ratio of the acicular particle to carbon black preferably ranges from 60:40 to 90:10. When the ratio of the acicular particle is lower than 60:40, the durability of the backcoat layer decreases since carbon black is contained as a main powder therein. When the ratio exceeds 90:10, the low proportion of carbon black causes the resistivity of the backcoat layer to increase, creating the possibility of charging.

The backcoat layer further comprises a binder. The quantity of the binder in the backcoat layer preferably ranges from 10 to 40 weight parts per 100 weight parts of a total weight of the acicular particle and carbon black. When the quantity of the binder in the backcoat layer falls within this range, there is little desorption of acicular particles and carbon black during running and a high coating strength can be achieved. Since the use of a large quantity of binder increases cost, from the perspective of economical efficiency, as well, the quantity of binder employed preferably falls within the aforementioned range. In the backcoat layer, the same binder may be employed as in the magnetic layer and the nonmagnetic layer, described further below. The thickness of the backcoat layer preferably ranges from 0.1 to 0.7 µm. When the thickness of the backcoat layer falls within this range, surface smoothness and coating strength can be ensured, and a higher-density magnetic recording medium with a thinner thickness can be achieved.

In the magnetic recording medium of the present invention, the backcoat layer comprises water-soluble cations in a quantity equal to or less than 100 ppm and water-soluble anions in a quantity equal to or less than 150 ppm. The quantity of water-soluble cations preferably ranges from 0 to 80 ppm, more preferably from 0 to 70 ppm. The quantity of water-soluble anions preferably ranges from 0 to 130 ppm, more preferably from 0 to 100 ppm. Examples of the water-soluble cations are $Na^+$, $K^+$, $Ca^{2+}$, $Mg^{2+}$, and $NH_4^+$. Examples of the water-soluble anions are $F^-$, $Cl^-$, $NO_2^-$, $NO_3^-$, $SO_4^{2-}$, and $PO_4^{3-}$. When a large quantity of water-soluble cations and anions is incorporated into the backcoat layer, there is a problem in that precipitation occurs due to the formation of salts by the two when stored at high temperature and humidity, for example. When precipitation occurs, the precipitates are transferred to the magnetic layer, where they cause harmful effects such as dropout increasing. In the present invention, when the quantity of water-soluble cations contained in the backcoat layer is equal to or less than 100 ppm and the quantity of water-soluble anions is equal to or less than 150 ppm, such precipitates do not form and the increase in dropout is prevented.

In particular, $Cl^-$ and $SO_4^{2-}$ tend to get mixed in during the manufacturing of acicular particles and carbon black, precipitating out as salts and compromising dropout. When these ions are incorporated in a large quantity, there is a risk of MR head corrosion. Thus, in the present invention, the quantity of $Cl^-$ and $SO_4^{2-}$ is preferably equal to or less than 70 ppm, more preferably equal to or less than 50 ppm.

In the present invention, the "quantity of water-soluble cations" and "quantity of water-soluble anions" are values calculated by determining the weight of the cationic component and anionic component in an aqueous extraction of a sample (powder or medium) by ion chromatography, and then figuring the concentration (ppm) by dividing the total weight of the cationic and anionic components by the weight of the sample employed during extraction. The quantities of water-soluble cations and anions in the backcoat layer are calculated by immersing a tape coated with just a backcoat layer for one hour in 25° C. pure water (distilled water) with stirring to obtain an extraction, and calculating the quantity of ions comprised in the backcoat layer by subtracting the quantity of ions eluting from a support. Alternatively, the magnetic layer and nonmagnetic layer can be peeled off of a tape that has been obtained by coating a magnetic layer, nonmagnetic layer, and backcoat layer on a support for use in measurement.

In the present invention, the quantity of water-soluble ions in the backcoat layer can be kept within the aforementioned desired range by suitably selecting starting components while bearing the following points in mind.

The quantity of water-soluble ions in carbon black varies due to impurities in the starting materials employed during manufacturing and due to impurities in water employed during cooling following production. Examples of carbon black containing few water-soluble ions are acetylene black and electrically-conductive carbon black. Removing impurities from ordinary carbon black by cleaning with ion-exchange water, distilled water, methanol, or the like also has the effect of reducing the total quantity of water-soluble ions.

To reduce the quantity of water-soluble ions in hematite, it is important to process impurities by follows; distilled water is employed in the reaction and cleaning of a starting material in the form of iron oxyhydroxide to thoroughly wash a product with water, and the product is again rendered a slurry in water and washed with water after dehydration by heating.

Using ammonia or ammonium carbonate instead of an alkali metal hydroxide or alkali carbonate as a source of the alkali employed in the reaction and surface treatment can also reduce the total quantity of water-soluble ions.

It is preferable to employ high-purity alumina since the quantity of water-soluble ions therein is low. Specific examples are commercial products such as HIT50, HIT60, HIT70, HIT80, and HIT100, manufactured by Sumitomo Chemical Co., Ltd.

In powders other than those set forth above, reducing impurities and intensifying water-washing during synthesis and surface treatments and in the slurry state following synthesis as mentioned above can also reduce the quantity of water-soluble ions.

It is also preferable that, in order to achieve a lubricating effect, the backcoat layer comprises a fatty acid and/or a fatty acid ester and/or a fatty acid amide in a quantity of 5 weight percent or less, wherein the fatty acid, fatty acid ester, and fatty acid amide respectively have carbon atoms ranging from 10 to 26. The quantity thereof preferably ranges from 0.1 to 3 weight percent. When the fatty acid, fatty acid ester, and fatty acid amide incorporated as a lubricant comprise carbon atoms of 10 or more, the boiling point is high and volatization tends not to occur. When this number is equal to or less than 26, the molecular weight is suitable and lubricant seepage properties are good. When the quantity thereof is equal to or less than 5 weight percent, a suitable coefficient of friction and high running durability are achieved, and the problem of plasticization of the coating is avoided.

Examples are: monobasic fatty acids (which may contain an unsaturated bond or be branched) having 10 to 24 carbon atoms and metal salts (such as Li, Na, K, and Cu) thereof; monohydric, dihydric, trihydric, tetrahydric, pentahydric or hexahydric alcohols with 12 to 22 carbon atoms (which may contain an unsaturated bond or be branched); alkoxy alcohols with 12 to 22 carbon atoms; monofatty esters, difatty esters, or trifatty esters comprising a monobasic fatty acid having 10 to 24 carbon atoms (which may contain an unsaturated bond or be branched) and any one from among a monohydric, dihydric, trihydric, tetrahydric, pentahydric or hexahydric alcohol having 2 to 12 carbon atoms (which may contain an unsaturated bond or be branched); fatty acid esters of monoalkyl ethers of alkylene oxide polymers; fatty acid amides with 8 to 22 carbon atoms; and aliphatic amines with 8 to 22 carbon atoms.

Specific examples of fatty acids are: capric acid, caprylic acid, lauric acid, myristic acid, palmitic acid, stearic acid, behenic acid, oleic acid, elaidic acid, linolic acid, linolenic acid, and isostearic acid. Specific examples of esters are butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyldodecyl palmitate, isohexadecyl stearate, oleyl oleate, dodecyl stearate, tridecyl stearate, oleyl erucate, neopentylglycol didecanoate, and ethylene glycol dioleyl. These lubricants, antistatic agents and the like need not be 100 percent pure and may contain impurities, such as isomers, unreacted material, by-products, decomposition products, and oxides in addition to the main components. These impurities are preferably comprised equal to or less than 30 percent, and more preferably equal to or less than 10 percent. Fatty acid esters and fatty acid amides of the aforementioned fatty acids can also be employed in the backcoat layer.

The density of protrusions having a height, measured by an atomic force microscope, of 50 to 100 nm is preferably equal to or less than 1,000, more preferably from 110 to 600, per 90 μm×90 μm area on the backcoat layer surface. When the density of protrusions on the backcoat layer surface falls within this range, it is possible to prevent the magnetic layer from being bitten into and from forming pits thereon. Since pressure is not dispersed when the protrusion density is reduced, the backcoat layer significantly bites into the magnetic layer. However, since the height of the protrusions significantly affects the biting into the magnetic layer, keeping the number of protrusions having a height of 50 to 100 nm within the aforementioned range reduces the effect of transfer. The thinner the magnetic layer becomes, the greater the tendency for protrusions on the backcoat layer to penetrate the magnetic layer and create gaps in the magnetic layer. Thus, the effect of controlling the number of protrusions present on the backcoat layer surface becomes more marked as the thickness of the magnetic layer is reduced. Further, the smaller the magnetic particles become, the more boundaries there are between particles and the greater the tendency of the coating to crack. Thus, pits on the magnetic layer caused by the protrusions present on the backcoat layer surface become even more marked. Accordingly, as the magnetic particles decrease in size, the effect achieved by controlling the number of protrusions 50 to 100 nm in height that are present on the backcoat layer surface becomes even more marked. The surface roughness of the backcoat layer can be equal to or less than 7 nm, for example, preferably equal to or less than 6 nm, and more preferably equal to or less than 5 nm.

[Magnetic Layer]

In the magnetic recording medium of the present invention, a magnetic layer may be provided directly on a support or may be provided over a nonmagnetic layer. Since a thin magnetic layer is employed with MR heads, a multilayered structure in which a nonmagnetic lower layer is employed is desirable. The coercivity Hc of the magnetic layer is preferably equal to or greater than 159 kA/M (2,000 Oe), more preferably from 159 kA/M (2,000 Oe) to 400 kA/M (5,000 Oe). Further, in the magnetization distribution of the magnetic layer, the component of magnetic reversal with the application of a magnetic field of 80 kA/M (1,000 Oe) or less is preferably specified as being a maximum of less than 1 percent, more preferably equal to or less than 0.7 percent, and further preferably equal to or less than 0.5 percent.

The thickness of the magnetic layer preferably ranges from 0.03 to 0.25 µm, more preferably from 0.03 to 0.2 µm, and still more preferably from 0.05 to 0.2 µm. When equal to or greater than 0.03 µm, high reproduction output can be achieved. When equal to or less than 0.25 µm, high resolution can be achieved. The squareness SQ measured in the in-plane direction of the magnetic layer preferably ranges from 0.6 to 0.95, more preferably from 0.65 to 0.85.

[Ferromagnetic Powder]

In the present invention, the ferromagnetic powder employed in the magnetic layer can be an acicular ferromagnetic alloy powder primarily comprising Fe such as Fe and Fe—Co, and a hexagonal ferrite powder. Examples of hexagonal ferrite powders are various substitution products of barium ferrite, strontium ferrite, lead ferrite, and calcium ferrite, and Co substitution products. Specific examples are magnetoplumbite-type barium ferrite and strontium ferrite; magnetoplumbite-type ferrite in which the particle surfaces are covered with spinels; and magnetoplumbite-type barium ferrite, strontium ferrite, and the like partly comprising a spinel phase. The following may be incorporated in addition to the prescribed atoms: Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, Nb, and the like. Compounds to which elements such as Co—Zn, Co—Ti, Co—Ti—Zr, Co—Ti—Zn, Ni—Ti—Zn, Nb—Zn—Co, Sb—Zn—Co, and Nb—Zn have been added may generally also be employed. They may comprise specific impurities depending on the starting materials and manufacturing methods, but those can also be employed in the present invention.

The particle size is preferably such that the mean volume of primary particles ranges from 1,000 to 10,000 $nm^3$, more preferably from 1,500 to 8,500 $nm^3$, and still more preferably from 1,500 to 6,500 $nm^3$ in both alloys and hexagonal ferrite. In the case of acicular alloy powder, the mean major axis length preferably ranges from 20 to 100 nm, more preferably from 25 to 80 nm. The crystallite size preferably ranges from 4 to 15 nm, more preferably from 6 to 13 nm. In the case of hexagonal ferrite, the hexagonal plate diameter preferably ranges from 10 to 50 nm, more preferably from 10 to 40 nm, and further preferably from 15 to 35 nm. In the case of reproduction with MR heads to improve track density, noise must be reduced, so the plate diameter is desirably equal to or less than 35 nm. However, stable magnetization cannot be achieved at less than 10 nm because of thermal fluctuation. Noise is high at greater than 50 nm in a manner unsuited to the high-density magnetic recording in the present invention. The plate ratio (plate diameter/plate thickness) preferably ranges from 1 to 15, more preferably from 1 to 7. Although a plate ratio of less than 1 results in a high fill property in the magnetic layer, it is impossible to achieve adequate orientation. At greater than 15, stacking of particles causes an increase in noise. The specific surface area by BET method within this particle size range is usually 10 to 100 $m^2/g$, almost corresponding to an arithmetic value from the particle plate diameter and the plate thickness. Narrow distributions of particle plate diameter and plate thickness are normally preferred. To assign a number is difficult, but these can be compared by randomly measuring 500 particles in a TEM photograph of particles. The distributions are often not a normal distribution. However, when expressed as the standard deviation to the average size, σ/average size=0.1 to 2.0. The particle producing reaction system is rendered as uniform as possible and the particles produced are subjected to a distribution-enhancing treatment to achieve a sharp particle size distribution. For example, methods such as selectively dissolving ultrafine particles in an acid solution are known.

The coercivity (Hc) in the magnetic material can be made 40 to 400 kA/M. Although a high Hc is advantageous to high-density recording, this is limited by the capacity of the recording head. In the present invention, the coercivity (Hc) of the magnetic material can ranges from about 119 to 397 kA/M, preferably from 159 to 320 kA/M. When the saturation magnetization of a head exceeds 1.4 tesla, the Hc of 175 kA/M or greater is preferred. The coercivity (Hc) can be controlled by means of the particle size, the type and quantities of elements incorporated, the substitution sites of the elements, the particle generating reaction conditions, and the like. The saturation magnetization (σ s) of the ferromagnetic alloy powder preferably ranges from 90 to 150 $Am^2/kg$ and that of the hexagonal ferrite preferably ranges from 40 to 80 $Am^2/kg$. The saturation magnetization (σ s) tends to decrease with decreasing particle size. Known methods of improving saturation magnetization (σ s) are combining spinel ferrite with magnetoplumbite ferrite, selection of the type and quantity of elements incorporated, and the like. It is also possible to employ W-type hexagonal ferrite.

When dispersing the ferromagnetic powder, the surface of the ferromagnetic powder particles may be processed with a substance suited to a dispersion medium and a polymer. Both organic and inorganic compounds can be employed as surface treatment agents. Examples of the principal compounds are oxides and hydroxides of Si, Al, P, and the like; various silane coupling agents; and various titanium coupling agents. The quantity of surface treatment agent added may range from 0.1 to 10 weight percent relative to the weight of the ferromagnetic powder. The pH of the ferromagnetic powder is also important to dispersion. A pH of about 4 to 12 is usually optimum for the dispersion medium and polymer. From the perspective of the chemical stability and storage properties of the medium, a pH of about 6 to 11 can be selected. Moisture contained in the ferromagnetic powder also affects dispersion. There is an optimum level for the dispersion medium and polymer, usually selected from the range of 0.01 to 2.0 percent. Methods of manufacturing hexagonal ferrite include the glass crystallization method in which a metal oxide substituted with barium oxide, iron oxide, and iron, and a glass-forming substance in the form of boron oxide or the like are mixed in proportions designed to yield a desired ferrite composition, melted, and quenched to obtain an amorphous product, subjected to a heat treatment again, washed, and pulverized to obtain barium ferrite crystal powder; the hydrothermal reaction method in which a barium ferrite composition metal salt solution is neutralized with an alkali, the by-products are removed, the solution is liquid-phase heated at equal to or higher than 100° C., and the solution is washed, dried, and pulverized to obtain barium ferrite crystal powder; and the coprecipitation method in which a barium ferrite composition metal salt solution is neutralized with an alkali, the by-products are removed, and the solution is dried, processed at equal to or less than 1,100° C., and pulverized to obtain barium ferrite crystal powder. However, any methods may be employed in the present invention.

[Nonmagnetic Layer]

The lower layer when a nonmagnetic layer is provided between a support and a magnetic layer will be described in detail below.

The configuration of the lower layer is not specifically limited in the present invention other than that it be essentially nonmagnetic. It is normally comprised of at least resin, with powder such as inorganic powder or organic powder being dispersed in the resin, for example. The inorganic powder is usually desirably a nonmagnetic powder, but to the extent that the lower layer remains essentially nonmagnetic, magnetic powder may also be employed. The nonmagnetic powder comprised in the lower layer can be selected from inorganic compounds such as metal oxides, metal carbonates, metal sulfates, metal nitrides, metal carbides, metal sulfides and the like. Examples of inorganic compounds are α-alumina having an α-conversion rate equal to or higher than 90 percent, β-alumina, γ-alumina, θ-alumina, silicon carbide, chromium oxide, cerium oxide, α-iron oxide, hematite, goethite, corundum, silicon nitride, titanium carbide, titanium dioxide, silicon dioxide, tin oxide, magnesium oxide, tungsten oxide, zirconium oxide, boron nitride, zinc oxide, calcium carbonate, calcium sulfate, barium sulfate, and molybdenum disulfide; these may be employed singly or in combination. Particularly desirable due to their narrow particle distribution and numerous means of imparting functions are titanium dioxide, zinc oxide, iron oxide and barium sulfate. Even more preferred are titanium dioxide and α-iron oxide. The particle size of these nonmagnetic powders preferably ranges from 0.005 to 2 µm, but nonmagnetic powders of differing particle size may be combined as needed, or the particle diameter distribution of a single nonmagnetic powder may be broadened to achieve the same effect. What is preferred most is a particle size in the nonmagnetic powder ranging from 0.01 to 0.2 µm. Particularly when the nonmagnetic powder is a granular metal oxide, a mean particle diameter equal to or less than 0.08 µm is preferred, and when an acicular metal oxide, the major axis length is preferably equal to or less than 0.3 µm, more preferably equal to or less than 0.2 µm. The tap density preferably ranges from 0.05 to 2 g/ml, more preferably from 0.2 to 1.5 g/ml. The moisture content of the nonmagnetic powder preferably ranges from 0.1 to 5 weight percent, more preferably from 0.2 to 3 weight percent, further preferably from 0.3 to 1.5 weight percent. The pH of the nonmagnetic powder preferably ranges from 2 to 11, and the pH between 5.5 to 10 is particular preferred. The specific surface area of the nonmagnetic powder preferably ranges from 1 to 100 $m^2/g$, more preferably from 5 to 80 $m^2/g$, further preferably from 10 to 70 $m^2/g$. The crystallite size of the nonmagnetic powder preferably ranges from 0.004 to 1 µm, further preferably from 0.04 to 0.1 µm. The oil absorption capacity using dibutyl phthalate (DBP) preferably ranges from 5 to 100 ml/100 g, more preferably from 10 to 80 ml/g, further preferably from 20 to 60 ml/100 g. The specific gravity preferably ranges from 1 to 12, more preferably from 3 to 6. The shape of the nonmagnetic powder may be any of acicular, spherical, polyhedral, or plate-shaped. The Mohs' hardness is preferably 4 to 10. The stearic acid (SA) adsorption capacity of the nonmagnetic powder preferably ranges from 1 to 20 $\mu mol/m^2$, more preferably from 2 to 15 $\mu mol/m^2$, further preferably from 3 to 8 $\mu mol/m^2$. The pH between 3 to 6 is preferred. The surface of these nonmagnetic powders is preferably treated with $Al_2O_3$, $SiO_2$, $TiO_2$, $ZrO_2$, $SnO_2$, $Sb_2O_3$, $ZnO$ and $Y_2O_3$. The surface-treating agents of preference with regard to dispersibility are $Al_2O_3$, $SiO_2$, $TiO_2$, and $ZrO_2$, and $Al_2O_3$, $SiO_2$ and $ZrO_2$ are further preferable. These may be used singly or in combination. Depending on the objective, a surface-treatment coating layer with a coprecipitated material may also be employed, the coating structure which comprises a first alumina coating and a second silica coating thereover or the reverse structure thereof may also be adopted. Depending on the objective, the surface-treatment coating layer may be a porous layer, with homogeneity and density being generally desirable.

Specific examples of nonmagnetic powders suitable for use in the lower layer in the present invention are: Nanotite from Showa Denko K. K.; HIT-100 and ZA-G1 from Sumitomo Chemical Co., Ltd.; α-hematite DPN-250, DPN-250BX, DPN-245, DPN-270BX, DPN-500BX, DBN-SA1 and DBN-SA3 from Toda Kogyo Corp.; titanium oxide TTO-51B, TTO-55A, TTO-55B, TTO-55C, TTO-55S, TTO-55D, SN-100, α-hematite E270, E271, E300 and E303 from Ishihara Sangyo Co., Ltd.; titanium oxide STT-4D, STT-30D, STT-30, STT-65C, and α-hematite α-40 from Titan Kogyo K. K.; MT-100S, MT-100T, MT-150W, MT-500B, MT-600B, MT-100F, and MT-500HD from Tayca Corporation; FINEX-25, BF-1, BF-10, BF-20, and ST-M from Sakai Chemical Industry Co., Ltd.; DEFIC-Y and DEFIC-R from Dowa Mining Co., Ltd.; AS2BM and TiO2P25 from Nippon Aerogil; 100A and 500A from Ube Industries, Ltd.; and sintered products of the same. Particular preferable nonmagnetic powders are titanium dioxide and α-iron oxide.

Carbon black can be added to the lower layer. Mixing carbon black achieves the known effects of lowering surface resistivity Rs and reducing light transmittance, as well as yielding the desired micro Vickers hardness. Further, the incorporation of carbon black into the lower layer can also serve to store lubricants. Examples of types of carbon black that are suitable for use are furnace black for rubber, thermal for rubber, black for coloring and acetylene black. Based on the effect desired, the following characteristics should be optimized in the carbon black employed in the lower layer, and effects may be achieved by using different carbon blacks in combination.

The specific surface area of carbon black employed in the lower layer preferably ranges from 100 to 500 $m^2/g$, more preferably from 150 to 400 $m^2/g$ and the DBP oil absorption capacity preferably ranges from 20 to 400 ml/100 g; more preferably from 30 to 400 ml/100 g. The particle diameter of carbon black preferably ranges from 5 to 80 nm, more preferably from 10 to 50 nm, further preferably from 10 to 40 nm. It is preferable for carbon black that the pH ranges from 2 to 10, the moisture content ranges from 0.1 to 10% and the tap density ranges from 0.1 to 1 g/ml. Specific examples of types of carbon black suitable for use in the present invention are: BLACK PEARLS 2000, 1300, 1000, 900, 800, 880, 700 and VULCAN XC-72 from Cabot Corporation; #3050B, #3150B, #3250B, #3750B, #3950B, #950, #650B, #970B, #850B, MA-600, MA-230, #4000 and #4010 from Mitsubishi Chemical Corporation; CONDUCTEX SC, RAVEN 8800, 8000, 7000, 5750, 5250, 3500, 2100, 2000, 1800, 1500, 1255 and 1250 from Columbia Carbon Co., Ltd.; and Ketjen Black EC from Lion Akzo Co., Ltd. The carbon black employed can be surface treated with a dispersing agent or the like, grafted with a resin, or a portion of the surface may be graphite-treated. Further, the carbon black may be dispersed with a binder prior to being added to the coating material. These types of carbon black can be employed in a range that does not exceed 50 weight percent with respect to the inorganic powder above and does not exceed 40 percent with respect to the total weight of the nonmagnetic layer. These types of carbon black may be employed singly or in combination. *The Carbon Black Handbook* compiled by the Carbon Black Association may be consulted for types of carbon black suitable for use in the present invention.

Based on the objective, an organic powder may be added to the lower layer. Examples are acrylic styrene resin powders, benzoguanamine resin powders, melamine resin powders, and phthalocyanine pigments. Polyolefin resin powders, polyester resin powders, polyamide resin powders, polyimide resin powders, and polyfluoroethylene resins may also be employed. The manufacturing methods described in Japanese Unexamined Patent Publication (KOKAI) Showa Nos. 62-18564 and 60-255827 may be employed.

As regards binder resins, lubricants, dispersants, and additives; solvents; dispersion methods and the like of the lower layer, those of magnetic layers can be applied. In particular, the techniques known with regard to magnetic layers may be applied to the quantity and types of binders, additives, and dispersants added.

[Binder]

Conventionally known thermoplastic resins, thermosetting resins, reactive resins and mixtures thereof may be employed as binders used in the present invention. The thermoplastic resins suitable for use have a glass transition temperature of −100 to 150° C., a number average molecular weight of 1,000 to 200,000, preferably from 10,000 to 100,000, and have a degree of polymerization of about 50 to 1,000.

Examples are polymers and copolymers comprising structural units in the form of vinyl chloride, vinyl acetate, vinyl alcohol, maleic acid, acrylic acid, acrylic acid esters, vinylidene chloride, acrylonitrile, methacrylic acid, methacrylic acid esters, styrene, butadiene, ethylene, vinyl butyral, vinyl acetal, and vinyl ether; polyurethane resins; and various rubber resins. Further, examples of thermosetting resins and reactive resins are phenol resins, epoxy resins, polyurethane cured resins, urea resins, melanine resins, alkyd resins, acrylic reactive resins, formaldehyde resins, silicone resins, epoxy polyamide resins, mixtures of polyester resins and isocyanate prepolymers, mixtures of polyester polyols and polyisocyanates, and mixtures of polyurethane and polyisocyanates. These resins are described in detail in the *Handbook of Plastics* published by Asakura Shoten. It is also possible to employ known electron beam-cured resins in individual layers. Examples thereof and methods of manufacturing the same are described in detail in Japanese Unexamined Patent Publication (KOKAI) Showa No. 62-256219. The above-listed resins may be used singly or in combination. Preferred resins are combinations of polyurethane resin and at least one member selected from the group consisting of vinyl chloride resin, vinyl chloride—vinyl acetate copolymers, vinyl chloride—vinyl acetate—vinyl alcohol copolymers, and vinyl chloride—vinyl acetate—maleic anhydride copolymers, as well as combinations of the same with polyisocyanate.

Known structures of polyurethane resin can he employed, such as polyester polyurethane, polyether polyurethane, polyether polyester polyurethane, polycarbonate polyurethane, polyester polycarbonate polyurethane, and polycaprolactone polyurethane. To obtain better dispersibility and durability in all of the binders set forth above, it is desirable to introduce by copolymerization or addition reaction one or more polar groups selected from among —COOM, —SO$_3$M, —OSO$_3$M, —P=O(OM)$_2$, —O—P=O(OM)$_2$, (where M denotes a hydrogen atom or an alkali metal), OH, NR$_2$, N$^+$R$_3$ (where R denotes a hydrocarbon group), epoxy groups, SH, and CN. The quantity of the polar group can be from $10^{-1}$ to $10^{-8}$ mol/g, preferably from $10^{-2}$ to $10^{-6}$ mol/g.

Specific examples of the binders employed in the present invention are VAGH, VYHH, VMCH, VAGF, VAGD, VROH, VYES, VYNC, VMCC, XYHL, XYSG, PKHH, PKHJ, PKHC, and PKFE from Union Carbide Corporation; MPR-TA, MPR-TA5, MPR-TAL, MPR-TSN, MPR-TMF, MPR-TS, MPR-TM, and MPR-TAO from Nisshin Kagaku Kogyo K. K.; 1000W, DX80, DX81, DX82, DX83, and 100FD from Denki Kagaku Kogyo K. K.; MR-104, MR-105, MR110, MR100, MR555, and 400X-110A from Nippon Zeon Co., Ltd.; Nippollan N2301, N2302, and N2304 from Nippon Polyurethane Co., Ltd.; Pandex T-5105, T-R3080, T-5201, Burnock D-400, D-210-80, Crisvon 6109, and 7209 from Dainippon Ink and Chemicals Incorporated.; Vylon UR8200, UR8300, UR-8700, RV530, and RV280 from Toyobo Co., Ltd.; Daipheramine 4020, 5020, 5100, 5300, 9020, 9022, and 7020 from Dainichiseika Color & Chemicals Mfg. Co., Ltd.; MX5004 from Mitsubishi Chemical Corporation; Sanprene SP-150 from Sanyo Chemical Industries, Ltd.; and Saran F310 and F210 from Asahi Chemical Industry Co., Ltd.

The binder employed in the nonmagnetic layer and magnetic layer is suitably employed in a range of 5 to 50 weight percent, preferably from 10 to 30 weight percent with respect to the nonmagnetic powder or the magnetic powder. Vinyl chloride resin, polyurethane resin, and polyisocyanate are preferably combined within the ranges of; 5 to 30 weight percent for vinyl chloride resin; 2 to 20 weight percent for polyurethane resin; and 2 to 20 weight percent for polyisocyanate. However, when a small amount of dechlorination causes head corrosion, it is also possible to employ polyurethane alone, or employ polyurethane and isocyanate alone. In the present invention, when polyurethane is employed, a glass transition temperature of −50 to 150° C., preferably 0 to 100° C., further preferably from 30 to 90° C., an elongation at break of 100 to 2,000 percent, a stress at break of 0.05 to 10 kg/mm$^2$, and a yield point of 0.05 to 10 kg/mm$^2$ are desirable.

The magnetic recording medium according to the present invention comprises at least two layers. Accordingly, the quantity of binder; the quantity of vinyl chloride resin, polyurethane resin, polyisocyanate, or some other resin in the binder; the molecular weight of each of the resins forming the magnetic layer; the quantity of polar groups; or the physical characteristics or the like of the above-described resins can naturally be different in the nonmagnetic layer and each of the magnetic layers as required. These should be optimized in each layer. Known techniques for a multilayered magnetic layer may be applied. For example, when the quantity of binder is different in each layer, increasing the quantity of binder in the magnetic layer effectively decreases scratching on the surface of the magnetic layer. To achieve good head touch, the quantity of binder in the nonmagnetic layer can be increased to impart flexibility.

Examples of polyisocyanates suitable for use in the present invention are tolylene diisocyanate, 4,4'-diphenylmethane diisocyanate, hexamethylene diisocyanate, xylylene diisocyanate, napthylene-1,5-diisocyanate, o-toluidine diisocyanate, isophorone diisocyanate, triphenylmethane triisocyanate, and other isocyanates; products of these isocyanates and polyalcohols; polyisocyanates produced by condensation of isocyanates; and the like. These isocyanates are commercially available under the following trade names, for example: Coronate L, Coronate HL, Coronate 2030, Coronate 2031, Millionate MR and Millionate MTL manufactured by Nippon Polyurethane Industry Co. Ltd.; Takenate D-102, Takenate D-110N, Takenate D-200 and Takenate D-202 manufactured by Takeda Chemical Industries Co., Ltd.; and Desmodule L, Desmodule IL, Desmodule N and Desmodule HL manufactured by Sumitomo Bayer Co., Ltd. They can be used singly or in combinations of two or more in all layers by exploiting differences in curing reactivity.

[Carbon Black, Abrasive]

Examples of types of carbon black that are suitable for use in the magnetic layer are: furnace black for rubber, thermal for rubber, black for coloring and acetylene black. The specific surface area can ranges from 5 to 500 $m^2/g$, the DBP oil absorption-capacity can ranges from 10 to 400 mL/100 g, the particle diameter can ranges from 5 to 300 nm, preferably from 10 to 250 nm, further preferably from 2 to 200 nm. A pH of 2 to 10, a moisture content of 0.1 to 10 percent, and a tap density of 0.1 to 1 g/cc are desirable. Specific examples of types of carbon black employed in the present invention are: BLACK PEARLS 2000, 1300, 1000, 900, 905, 800, 700 and VULCAN XC-72 from Cabot Corporation; #80, #60, #55, #50 and #35 manufactured by Asahi Carbon Co., Ltd.; #2400B, #2300, #900, #1000, #30, #40 and #10B from Mitsubishi Chemical Corporation; CONDUCTEX SC, RAVEN 150, 50, 40, 15 and RAVEN MT-P from Columbia Carbon Co., Ltd.; and Ketjen Black EC from Lion Akzo Co., Ltd. The carbon black employed may be surface-treated with a dispersant or grafted with resin, or have a partially graphite-treated surface. The carbon black may be dispersed in advance into the binder prior to addition to the magnetic coating material. These carbon blacks may be used singly or in combination. When employing carbon black, the quantity preferably ranges from 0.1 to 30 percent with respect to the magnetic material. In the magnetic layer, carbon black works to prevent static, reduce the coefficient of friction, impart light-blocking properties, enhance film strength, and the like; the properties vary with the type of carbon black employed. Accordingly, the type, quantity, and combination of carbon blacks employed in the present invention may be determined separately for the upper magnetic layer and the lower nonmagnetic layer based on the objective and the various characteristics stated above, such as particle size, oil absorption capacity, electrical conductivity, and pH, and be optimized for each layer. For example, the *Carbon Black Handbook* compiled by the Carbon Black Association may be consulted for types of carbon black suitable for use in the magnetic layer of the magnetic recording medium of the present invention.

Known materials, chiefly with a Mohs' hardness equal to or higher than 6, such as α-alumina having an α-conversion rate equal to or higher than 90 percent, β-alumina, silicon carbide, chromium oxide, cerium oxide, α-iron oxide, corundum, artificial diamond, silicon nitride, titanium carbide, titanium oxide, silicon dioxide, and boron nitride, may be used singly or in combination as abrasives in the present invention. Further, a composite comprising two or more of these abrasives (an abrasive obtained by surface-treating one abrasive with another) may also be used. Although these abrasives may contain compounds and elements other than the main component or element in some cases, there is no change in effect so long as the main component constitutes equal to or higher than 90 percent. The particle size of these abrasives preferably ranges from 0.01 to 2 μm, further preferably from 0.05 to 1.0 μm, particularly preferably from 0.05 to 0.5. A narrow particle size distribution is particularly desirable for improving electromagnetic characteristics. As needed to improve durability, abrasives of differing particle size may be combined or the same effect may be achieved by broadening the particle diameter distribution even with a single abrasive. A tap density of 0.3 to 2 g/cc, a moisture content of 0.1 to 5 percent, a pH of 2 to 11, and a specific surface area of 1 to 30 $m^2/g$ are desirable. The abrasive employed in the present invention may be any of acicular, spherical, or cubic in shape, but shapes that are partially angular have good abrasion properties and are thus preferred. Specific examples: AKP-12, AKP-15, AKP-20, AKP-30, AKP-50, HIT-20, HIT-30, HIT-55, HIT-60, HIT-70, HIT-80 and HIT-100 from Sumitomo Chemical Co., Ltd.; ERC-DBM, HP-DBM, and HPS-DBM from Reynolds Co.; WA10000 from Fujimi Abrasives Co.; UB20 from Kamimura Kogyo Co., Ltd.; G-5, Chromex U2, and Chromex U1 from Nippon Chemical Industrial Co., Ltd.; TF100 and TF-140 from Toda Kogyo Corp.; Beta Random Ultrafine from Ibidene Co.; and B-3 from Showa Mining Co., Ltd. As needed, these abrasives may be added to the nonmagnetic layer. Addition to the nonmagnetic layer permits control of surface shape and control of the manner in which the abrasive protrudes. It is, as a matter of course, preferred that the particle diameter and quantity of abrasive added to the magnetic layer and nonmagnetic layer are optimally established.

[Additives]

Substances having lubricating effects, antistatic effects, dispersive effects, plasticizing effects, or the like may be employed as additives in the magnetic layer and nonmagnetic layer in the present invention.

Examples of additives are: molybdenum disulfide; tungsten graphite disulfide; boron nitride; graphite fluoride; silicone oils; silicones having a polar group; fatty acid-modified silicones; fluorine-containing silicones; fluorine-containing alcohols; fluorine-containing esters; polyolefins; polyglycols; alkylphosphoric esters and their alkali metal salts; alkylsulfuric esters and their alkali metal salts; polyphenyl ethers; phenylphosphonic acid; α-naphthylphosphoric acid; phenylphosphoric acid; diphenylphosphoric acid; p-ethylbenzenephosphonic acid; phenylphosphinic acid; aminoquinones; various silane coupling agents and titanium coupling agents; fluorine-containing alkylsulfuric acid esters and their alkali metal salts; monobasic fatty acids (which may contain an unsaturated bond or be branched) having 10 to 24 carbon atoms and metal salts (such as Li, Na, K, and Cu) thereof; monohydric, dihydric, trihydric, tetrahydric, pentahydric or hexahydric alcohols with 12 to 22 carbon atoms (which may contain an unsaturated bond or be branched); alkoxy alcohols with 12 to 22 carbon atoms (which may contain an unsaturated bond or be branched); monofatty esters, difatty esters, or trifatty esters comprising a monobasic fatty acid having 10 to 24 carbon atoms (which may contain an unsaturated bond or be branched) and any one from among a monohydric, dihydric, trihydric, tetrahydric, pentahydric or hexahydric alcohol having 2 to 12 carbon atoms (which may contain an unsaturated bond or be branched); fatty acid esters of monoalkyl ethers of alkylene oxide polymers; fatty acid amides with 8 to 22 carbon atoms; and aliphatic amines with 8 to 22 carbon atoms.

Specific examples of the additives in the form of fatty acids are: capric acid, caprylic acid, lauric acid, myristic acid, palmitic acid, stearic acid, behenic acid, oleic acid, elaidic acid, linolic acid, linolenic acid, and isostearic acid.

Examples of esters are butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyldodecyl palmitate, isohexadecyl stearate, oleyl oleate, dodecyl stearate, tridecyl stearate, oleyl erucate, neopentylglycol didecanoate, and ethylene glycol dioleyl. Examples of alcohols are oleyl alcohol, stearyl alcohol, and lauryl alcohol. It is also possible to employ nonionic surfactants such as alkylene oxide-based surfactants, glycerin-based surfactants, glycidol-based surfactants and alkylphenolethylene oxide adducts; cationic surfactants such as cyclic amines, ester amides, quaternary ammonium salts, hydantoin derivatives, heterocycles, phosphoniums, and sulfoniums; anionic surfactants comprising acid groups, such as carboxylic acid, sulfonic acid, phosphoric acid, sulfuric ester groups, and phosphoric ester groups; and ampholytic surfactants such as amino acids, amino sulfonic acids, sulfuric or phosphoric esters of amino alcohols, and alkyl betaines. Details of these surfactants are described in *A Guide to Surfactants* (published by Sangyo Tosho K.K.). These lubricants, antistatic agents and the like need not be 100 percent pure and may contain impurities, such as isomers, unreacted material, by-products, decomposition products, and oxides in addition to the main components. These impurities are preferably comprised equal to or less than 30 percent, and more preferably equal to or less than 10 percent.

The lubricants and surfactants suitable for use in the present invention each have different physical effects. The type, quantity, and combination ratio of lubricants producing synergistic effects should be optimally set for a given objective. It is conceivable to control bleeding onto the surface through the use of fatty acids having different melting points in the nonmagnetic layer and the magnetic layer; to control bleeding onto the surface through the use of esters having different boiling points, melting points, and polarity; to improve the stability of coatings by adjusting the quantity of surfactant; and to increase the lubricating effect by increasing the amount of lubricant in the intermediate layer. The present invention is not limited to these examples. Generally, a total quantity of lubricant ranging from 0.1 to 50 percent, preferably from 2 to 25 percent with respect to the ferromagnetic powder or the nonmagnetic powder is preferred.

All or some of the additives suitable for use in the present invention may be added at any stage in the process of manufacturing the magnetic and nonmagnetic coating liquids. For example, they may be mixed with the ferromagnetic powder before a kneading step; added during a step of kneading the ferromagnetic powder, the binder, and the solvent; added during a dispersing step; added after dispersing; or added immediately before coating. Depending on the objective, part or all of the additives may be applied by simultaneous or sequential coating after the magnetic layer has been applied to achieve a specific purpose. Depending on the objective, the lubricant may be coated on the surface of the magnetic layer after calendering or making slits.

Known organic solvents can be employed in the present invention. For example, solvents described in Japanese Unexamined Patent Publication (KOKAI) Showa No. 6-68453 can be employed.

[Support]

The support employed in the present invention is not specifically limited, but an essentially nonmagnetic and flexible support is preferred.

Known films can be employed such as polyesters such as polyethylene terephthalate and polyethylene naphthalate, polyolefins, cellulose triacetate, polycarbonates, polyamides, polyimides, polyamidoimides, polysulfones, polyaramides, aromatic polyamides, and polybenzooxazoles. Of these, the use of high-strength supports such as polyethylene naphthalate and polyamide is preferred. To change the surface roughness of the magnetic surface and the support surface, a laminated support such as those described in Japanese Unexamined Patent Publication (KOKAI) Heisei No. 3-224127 may be employed as required. These supports may be subjected beforehand to corona discharge treatment, plasma treatment, adhesion-enhancing treatment, heat treatment, dust removal, or the like. Aluminum and glass substrates may be employed as the support in the present invention.

To achieve the objects of the present invention, the center surface average surface roughness SRa of the support as measured by the Mirau method with a TOPO-3D made by WYKO is preferably equal to or less than 8.0 nm, more preferably equal to or less than 4.0 nm, and further preferably equal to or less than 2.0 nm. Not only does such a support desirably have a low center surface average surface roughness, but there are also desirably no large protrusions equal to or higher than 0.5 µm. The surface roughness shape may be freely controlled through the size and quantity of filler added to the support as needed. Examples of such fillers are oxides and carbonates of elements such as Ca, Si, and Ti, and organic micropowders such as acrylic-based one. The support desirably has a maximum height $SR_{max}$ equal to or less than 1 µm, a ten-point average roughness $SR_Z$ equal to or less than 0.5 µm, a center surface peak height $SR_P$ equal to or less than 0.5 µm, a center surface valley depth $SR_V$ equal to or less than 0.5 µm, a center-surface surface area percentage SSr of 10 percent to 90 percent, and an average wavelength $S \lambda_a$ of 5 to 300 µm. To achieve desired electromagnetic characteristics and durability, the surface protrusion distribution of the support can be freely controlled with fillers. It is possible to control within a range from 0 to 2,000 protrusions of 0.01 to 1 µm in size per 0.1 mm². The F-5 value of the support employed in the present invention desirably ranges from 5 to 50 kg/mm². The thermal shrinkage rate of the support after 30 min at 100° C. is preferably equal to or less than 3 percent, more preferably equal to or less than 1.5 percent. The thermal shrinkage rate after 30 min at 80° C. is preferably equal to or less than 1 percent, more preferably equal to or less than 0.5 percent. The breaking strength of the nonmagnetic support preferably ranges from 5 to 100 kg/mm². The modulus of elasticity preferably ranges from 100 to 2,000 kg/mm². The thermal expansion coefficient preferably ranges from $10^{-4}$ to $10^{-8}$/° C., more preferably from $10^{-5}$ to $10^{-6}$/° C. The moisture expansion coefficient is preferably equal to or less than $10^{-4}$/RH percent, more preferably equal to or less than $10^{-5}$/RH percent. These thermal characteristics, dimensional characteristics, and mechanical strength characteristics are desirably nearly equal, with a difference equal to less than 10 percent, in all in-plane directions in the support.

[Layer Structure]

With respect to the thickness structure of the magnetic recording medium of the present invention, the thickness of the support preferably ranges from 2 to 100 µm, more preferably from 2 to 80 µm. For computer-use magnetic recording tapes, the support having a thickness of 3.0 to 6.5 µm, preferably 3.0 to 6.0 µm, more preferably 4.0 to 5.5 µm is suitably employed.

An undercoating layer for improving adhesion between the support and the nonmagnetic layer or magnetic layer may be provided. The thickness of the undercoating layer preferably ranges from 0.01 to 0.5 μm, more preferably from 0.02 to 0.5 μm.

The thickness of the nonmagnetic lower layer in the magnetic recording medium of the present invention preferably ranges from 0.2 to 5.0 μm, more preferably from 0.3 to 3.0 μm, and still more preferably from 1.0 to 2.5 μm. The lower layer in the medium of the present invention produces its effect so long as it is an essentially nonmagnetic layer. For example, even when a trace amount of magnetic material is contained either as an impurity or incorporated intentionally, the effect of the present invention is exhibited and the structure may be seen as being essentially identical to that of the present invention. The phrase "essentially nonmagnetic layer" means that the residual magnetic flux density of the lower layer is equal to or less than 0.01 T (100 G) or the coercivity is equal to or less than 7,960 A/m (100 Oe); preferably, no residual magnetic flux density or coercivity is exhibited.

[Manufacturing Method]

The process for manufacturing the magnetic layer coating liquid and the nonmagnetic layer coating liquid comprises at least a kneading step, a dispersing step, and a mixing step to be carried out, if necessary, before and/or after the kneading and dispersing steps. Each of the individual steps may be divided into two or more stages. All of the starting materials employed in the present invention, including the ferromagnetic powder, nonmagnetic powder, binders, carbon black, abrasives, antistatic agents, lubricants, solvents, and the like, may be added at the beginning of, or during, any of the steps. Moreover, the individual starting materials may be divided up and added during two or more steps. For example, polyurethane may be divided up and added in the kneading step, the dispersion step, and the mixing step for viscosity adjustment after dispersion. To achieve the object of the present invention, conventionally known manufacturing techniques may be utilized for some of the steps. A kneader having a strong kneading force, such as an open kneader, continuous kneader, pressure kneader, or extruder is preferably employed in the kneading step. When a kneader is employed, the ferromagnetic powder or nonmagnetic powder and all or part of the binder (preferably equal to or higher than 30 percent of the entire quantity of binder) are kneaded in a range of 15 to 500 parts per 100 parts of the ferromagnetic powder. Details of the kneading process are described in Japanese Unexamined Patent Publication (KOKAI) Heisei Nos. 1-106338 and 1-79274. Further, glass beads may be employed to disperse the magnetic layer coating liquid and the nonmagnetic layer coating liquid, with a dispersing medium with a high specific gravity such as zirconia beads, titania beads, and steel beads being suitable for use. The particle diameter and fill ratio of these dispersing media are optimized for use. A known dispersing device may be employed.

Methods such as the following are desirably employed when coating a multilayer-structured magnetic recording medium in the present invention;

(1) A method in which the lower layer is first applied with a coating device commonly employed to apply magnetic coating materials such as a gravure coating, roll coating, blade coating, or extrusion coating device, and the magnetic layer is applied while the lower layer is still wet by means of a support pressure extrusion coating device such as is disclosed in Japanese Examined Patent Publication (KOKOKU) Heisei No. 1-46186 and Japanese Unexamined Patent Publication (KOKAI) Showa No. 60-238179 and Japanese Unexamined Patent Publication (KOKAI) Heisei No. 2-265672;

(2) A method in which the upper and lower layers are applied nearly simultaneously by a single coating head having two built-in slits for passing coating liquid, such as is disclosed in Japanese Unexamined Patent Publication (KOKAI) Showa No. 63-88080, Japanese Unexamined Patent Publication (KOKAI) Heisei No. 2-17971, and Japanese Unexamined Patent Publication (KOKAI) Heisei No. 2-265672; and (3) A method in which the upper and lower layers are applied nearly simultaneously using an extrusion coating apparatus with a backup roller as disclosed in Japanese Unexamined Patent Publication (KOKAI) Heisei No. 2-174965. To avoid deteriorating the electromagnetic characteristics or the like of the magnetic recording medium by aggregation of magnetic particles, shear is desirably imparted to the coating liquid in the coating head by a method such as disclosed in Japanese Unexamined Patent Publication (KOKAI) Showa No. 62-95174 or Japanese Unexamined Patent Publication (KOKAI) Heisei No. 1-236968. In addition, the viscosity of the coating liquid can satisfy the numerical range specified in Japanese Unexamined Patent Publication (KOKAI) Heisei No. 3-8471. Applying the lower layer, drying it, and then applying the magnetic layer thereover in a sequential multilayer coating to achieve the structure of the present invention is also possible, and does not compromise the effect of the present invention. However, to reduce the number of voids in the coating and improve the quality as regards dropout and the like, the above-describe simultaneous multilayer coating is preferred.

In magnetic tapes, cobalt magnets and solenoids can be employed to impart orientation in the longitudinal direction. The temperature and flow volume of the drying air, and coating rate are desirably controlled to control the drying position of the coating. The coating rate preferably ranges from 20 to 1,000 m/min, and the temperature of the drying air is preferably equal to or higher than 60° C. It is also possible to conduct suitable predrying prior to entering the magnet zone.

Processing may be conducted with calender rolls in the form of heat-resistant plastic rolls such as epoxy, polyimide, polyamide, and polyimidoamide, or metal rolls. When forming two-surface magnetic layers, treatment with metal rolls is particularly desirable. The processing temperature is preferably equal to or higher than 50° C., more preferably equal to or higher than 100° C. The linear pressure is preferably equal to or higher than 200 kg/cm, more preferably equal to or higher than 300 kg/cm.

[Physical Characteristics]

The saturation magnetic flux density of the magnetic layer is preferably equal to or greater than 0.2 T (2,000 G) and equal to or less than 0.5 T (5,000 G) when ferromagnetic metal powder is employed, and equal to or greater than 0.1 T (1,000 G) and equal to or less than 0.3 T (3,000 G) when hexagonal ferrite is employed. Coercivities Hc and Hr are preferably equal to or greater than 119 kA/m (1,500 Oe) and equal to or less than 398 kA/m (5,000 Oe), more preferably equal to or greater than 135 kA/m (1,700 Oe) and equal to or less than 239 kA/m (3,000 Oe). The narrower the coercivity distribution the better; SFD and SFDr are preferably equal to or less than 0.6. In the case of two-dimensional random, squareness is preferably equal to or greater than 0.55 and equal to or less than 0.67, more preferably equal to or greater than 0.58 and equal to or less than 0.64. In the case of three-dimensional random, squareness is preferably equal to or greater than 0.45 and equal to or less than 0.55. When vertically oriented, squareness is preferably equal to or greater than 0.6, more preferably equal to or greater than 0.7 in the vertical direction. When demagnetizing field correction is conducted, the squareness is preferably equal to or greater than 0.7, more preferably equal to or greater than 0.8. The orientation ratios of two-dimensional and three-dimensional random are both preferably equal to or greater than 0.8. In the case of two-dimensional random, it is preferable for vertical squareness, Br, Hc, and Hr to all be within 0.1 to 0.5-fold their values in the in-plane direction.

In a magnetic tape, squareness is preferably equal to or greater than 0.7, more preferably equal to or greater than 0.8. In the magnetic recording medium of the present invention, the coefficient of friction relative to the head is preferably equal to or less than 0.5 and more preferably equal to or less than 0.3 over a temperature range of $-10°$ C. to $40°$ C. and a humidity range of 0 to 95 percent; the surface resistivity is preferably from $10^4$ to $10^{12}$ $\Omega$/sq of magnetic surface; and the charge potential is preferably from $-500$ V to $+500$ V. The modulus of elasticity at 0.5 percent elongation of the magnetic layer is preferably from 0.98 to 19.6 GPa (100 to 200 kg/mm$^2$) in all in-plane directions and the breaking strength is preferably from 98 to 686 MPa (10 to 70 kg/mm$^2$). The modulus of elasticity of the magnetic recording medium is preferably 0.98 to 14.7 GPa (100 to 1,500 kg/mm$^2$) in all in-plane directions, and the residual elongation is preferably equal to or less than 0.5 percent. The thermal shrinkage rate at all temperatures equal to or less than $100°$ C. is preferably equal to or less than 1 percent, more preferably equal to or less than 0.5 percent, and further preferably equal to or less than 0.1 percent. The glass transition temperature (i.e., the temperature at which the loss elastic modulus of dynamic viscoelasticity as measured at 110 Hz peaks) of the magnetic layer is preferably equal to or greater than $50°$ C. and equal to or less than $120°$ C.; that of the nonmagnetic lower layer is preferably from 0 to $100°$ C. The loss elastic modulus preferably falls within the range of $1 \times 10^8$ to $8 \times 10^9$ dyne/cm$^2$ ($1 \times 10^7$ to $8 \times 10^8$ Pa), and the loss tangent is preferably equal to or less than 0.2. An excessively high loss tangent tends to result in adhesion failure. These thermal and mechanical characteristics are preferably roughly equal to within 10 percent in all in-plane directions of the medium. There is preferably equal to or less than 100 mg/m$^2$, more preferably equal to or less than 10 mg/m$^2$, of a residual solvent contained in the magnetic layer. The void ratio in the coating layer in both the nonmagnetic layer and magnetic layer is preferably equal to or less than 30 volume percent, more preferably equal to or less than 20 volume percent. A low void ratio is desirable for achieving high output, but depending on the objective, there are times when it is better to ensure a certain level. For example, in disk media in which repeat applications are important, higher void ratios often result in better running durability.

The center plane mean surface roughness Ra of the magnetic layer is preferably equal to or less than 4.0 nm, more preferably equal to or less than 3.8 nm, and still more preferably equal to or less than 3.5 nm when measured for a surface area of about 250 μm×250 μm by a Mirau method with a TOPO-3D made by WYCO. The maximum height of the magnetic layer SRmax is preferably equal to or less than 0.5 μm, the ten-point average surface roughness SRz is preferably equal to or less than 0.3 μm, the center surface peak height SRp is preferably equal to or less than 0.3 μm, the center surface valley depth SRv is preferably equal to or less than 0.3 μm, the center-surface surface area percentage SSr is preferably equal to or greater than 20 percent and equal to or less than 80 percent, and the average wavelength S $\lambda$ a is preferably equal to or greater than 5 μm and equal to or less than 300 μm to optimize electromagnetic characteristics and the coefficient of friction. These can be readily achieved by controlling surface properties through the filler used in the support, by controlling the particle diameter and quantity of the powder added to the magnetic layer as set forth above, and by controlling the roll surface configuration in calendar processing. Curling is preferably controlled to within ±3 mm.

When the magnetic recording medium of the present invention comprises a nonmagnetic layer and a magnetic layer, it will be readily deduced that the physical properties of the nonmagnetic layer and magnetic layer may be varied based on the objective. For example, the modulus of elasticity of the magnetic layer may be increased to improve running durability while simultaneously employing a lower modulus of elasticity than that of the magnetic layer in the nonmagnetic layer to improve the head contact of the magnetic recording medium.

EMBODIMENTS

The specific examples of the present invention will be described below. However, the present invention is not limited to the examples.

Embodiment 1

<Preparation of Coating Liquid>

Magnetic Coating Liquid (1)

| Magnetic coating liquid 1 (Hexagonal ferrite: Disc) | |
|---|---|
| Ferromagnetic metal powder | 100 parts |
| Co/Fe = 30 atomic %, Al/Fe = 8 atomic %, | |
| Y/Fe = 6 atomic % | |
| Hc: $1.87 \times 10^5$ A/m (2,350 Oe) | |
| Specific surface area: 55 m$^2$g | |
| σs: 140 A · m$^2$/kg (140 emu/g) | |
| Crystallite size: 140 Å | |
| Major axis length: 0.068 μm | |
| Acicular ratio: 6 | |
| Surface oxide film thickness: 25 Å | |
| Vinyl chloride polymer | 12 parts |
| MR110 (from Nippon Zeon Co., Ltd.) | |
| Polyurethane resin | 4 parts |
| UR 8200 (from Toyobo Co., Ltd.) | |
| α-Alumina (mean particle size: 0.15 μm) | 5 parts |
| Carbon black (mean particle size: 40 nm) | 5 parts |
| Butyl stearate | 5 parts |
| Stearic acid | 6 parts |
| Methyl ethyl ketone | 180 parts |
| Cyclohexanone | 180 parts |

<Nonmagnetic Coating Liquid>

| | |
|---|---|
| Nonmagnetic powder acicular hematite | 80 parts |
| Mean major axis length: 0.15 μm | |
| Specific surface area by BET method: 50 m$^2$/g | |
| pH: 8.5 | |
| Surface treatment agent: Al$_2$O$_3$ | |
| Carbon black (mean particle diameter: 20 nm) | 20 parts |
| Vinyl chloride copolymer | 12 parts |
| MR110 (from Nippon Zeon Co., Ltd.) | |

-continued

| | |
|---|---|
| Polyurethane resin UR 8200 (from Toyobo Co., Ltd.) | 5 parts |
| Butyl stearate | 1 part |
| Stearic acid | 3 parts |
| Methyl ethyl ketone/cyclohexanone (8/2 mixed solution) | 250 parts |

<Backcoat Layer>

| | |
|---|---|
| Nonmagnetic powder acicular hematite (see Table 1) Mean major axis length: 0.16 μm Specific surface area by BET method: 55 m$^2$/g pH: 8.9 Surface treatment agent: Al$_2$O$_3$ | 80 parts |
| Carbon black (see Table 2) Mean primary particle diameter: 17 nm S$_{BET}$: 210 m$^2$/g DBP oil absorption capacity: 68 ml/100 g | 20 parts |
| Polyurethane resin UR 8200 (from Toyobo Co., Ltd.) | 18.5 parts |
| Stearic acid | 3 parts |
| Methyl ethyl ketone/cyclohexanone (8/2 mixed solution) | 250 parts |

Table 1 gives the results of measurement of the quantity of water-soluble ions in carbon black, hematite, and alumina. Carbon blacks 1 through 4 were manufactured by varying the purity and degree of water-washing of the starting materials.

Manufacturing Method: Computer Tape

Each component of the above magnetic layer and nonmagnetic layer coating materials was kneaded in a kneader and dispersed for four hours in a sand mill. To the dispersions obtained, 2.5 parts of polyisocyanate were added to the coating liquid of the nonmagnetic layer and 3 parts to the coating liquid of the magnetic layer, after which 40 parts of cyclohexanone were added to each. The coating liquids were passed through a filter having a mean pore diameter of 1 μm to prepare coating liquids for the nonmagnetic layer and magnetic layer. The backcoat layer coating liquid was obtained by kneading the above-listed components with a roll mill having three rolls, dispersing the components in a sand mill, adding 20 parts of polyisocyanate and 1,000 parts of methyl ethyl ketone to the dispersion solution obtained, and filtering the mixture with a filter having a mean pore diameter of 1 μm. Simultaneous multilayer coating was conducted by applying the nonmagnetic layer coating liquid in a quantity calculated to yield a dry lower layer 1.7 μm in thickness and immediately thereafter applying thereover the magnetic layer coating liquid in a quantity calculated to yield a magnetic layer thickness of 0.1 μm on an aramid support having a thickness of 4.4 μm and a center-surface average surface roughness of 2 nm. While still wet, the two layers were oriented with a cobalt magnet having a magnetic force of 0.6 T (6,000 G) and a solenoid having a magnetic force of 0.6 T (6,000 G). After drying, the product was processed at a rate of 200 m/min at a temperature of 85° C. in a seven-stage calendar comprised of metal rolls. Subsequently, a backcoat layer was applied to a thickness of 0.5 μm. The product was slit to a width of 8 mm, the slit product was fed out, the product was picked up by a device having a winding unit in a manner in which nonwoven cloth and a razor blade pressed against the magnetic surface, and the surface of the magnetic layer was cleaned with a tape cleaning unit to obtain tape samples.

The various properties of the computer tape were evaluated by the following measurement methods.

(1) Center-surface Average Surface Roughness (Ra)

Surface roughness (Ra) by 3D-MIRAU: Using a TOPO3D made by WYKO Corp., the Ra, Rrms, and peak-valley value of a roughly 250 μm×250 μm area were measured by the Mirau method. Spherical surface correction and columnar correction were applied at a measurement wavelength of about 650 nm. This method is a non-contact surface roughness measurement by optical interference.

(2) Quantity of Water-soluble Ions in the Powder and in the Backcoat Layer (a) Quantity of Water-soluble Ions in the Carbon Black, Hematite, and Alumina

TABLE 1

| | Water-soluble cation (ppm) | | | | | Total of | Water-soluble anion (ppm) | | | | | | Total of |
|---|---|---|---|---|---|---|---|---|---|---|---|---|---|
| Particle | Na$^+$ | NH$_4^+$ | K$^+$ | Mg$^{2+}$ | Ca$^{2+}$ | cations (ppm) | Cl$^-$ | NO$_2^-$ | Br$^-$ | NO$_3^-$ | PO$_4^{3-}$ | SO$_4^{2-}$ | anions (ppm) |
| Carbon black 1 | 1 | 0 | 48 | 0 | 0 | 49 | 10 | 0 | 0 | 0 | 0 | 54 | 64 |
| Carbon black 2 | 1 | 2 | 1 | 1 | 0 | 5 | 1 | 0 | 0 | 1 | 0 | 0 | 2 |
| Carbon black 3 | 188 | 10 | 122 | 7 | 23 | 350 | 7 | 0 | 0 | 3 | 0 | 560 | 570 |
| Carbon black 4 | 7 | 4 | 2 | 1 | 1 | 15 | 4 | 0 | 0 | 1 | 0 | 2 | 7 |
| Hematite 1 | 42 | 2 | 13 | 7 | 9 | 73 | 15 | 0 | 0 | 0 | 104 | 11 | 130 |
| Hematite 2 | 234 | 2 | 20 | 0 | 1 | 257 | 23 | 0 | 0 | 0 | 94 | 8 | 125 |
| Alumina 1 | 2 | 5 | 2 | 2 | 0 | 11 | 0 | 0 | 0 | 10 | 0 | 0 | 10 |

Pure water was added to 5 g of carbon black to 50 cc and stirring was conducted for 1 hour at 25° C. to obtain an extraction. The extraction was then subjected to ion chromatography to measure the quantities of cations (Na$^+$, K$^+$, Ca$^{2+}$, Mg$^{2+}$, NH$_4^+$) and anions (Cl$^-$, NO$_2^-$, Br$^-$, NO$_3^-$, PO$_4^{3-}$, SO$_4^{2-}$). The quantity of water-soluble cations was given by the concentration (ppm) of the total quantity of cations (Na$^+$, K$^+$, Ca$^{2+}$, Mg$^{2+}$, NH$_4^+$) divided by the 5 g of carbon black. The quantity of water-soluble anions was given by the concentration (ppm) of the total quantity of anions (Cl$^-$, NO$_2^-$, Br$^-$, NO$_3^-$, PO$_4^{3-}$, SO$_4^{2-}$) divided by the 5 g of carbon black. The same method was used to obtain measurement values for hematite and alumina.

(b) A Tape Coated with Just a Backcoat Layer (Weight of Backcoat 0.5 g) was immersed for one hour in pure (distilled) water at 25° C. with stirring. This extraction was subjected to ion chromatography to determine the quantity of water-soluble cations (Na$^+$, K$^+$, Ca$^{2+}$, Mg$^{2+}$, NH$_4^+$) and the quantity of water-soluble anions (Cl$^-$, NO$_2^-$, Br$^-$, NO$_3^-$, PO$_4^{3-}$, SO$_4^{2-}$).

(3) Coefficient of Friction of Backcoat Layer

A tape was wrapped at 90 degrees on a pole of SUS420J 4 mm in diameter and the coefficient of friction was measured with a load of 20 g at a pull rate of 14 mm/sec in an environment of 23° C. and 70 percent RH.

(4) Storage Property

The coefficient of friction and tape surface were observed by optical microscopy and SEM after storage for one week at 60° C. and 90 percent RH. An evaluation of "O" was assigned when no precipitate were observed on the surface of the tape (on backcoat layer), "″" when a small quantity of precipitate was observed, and "X" when a large quantity of precipitate was observed.

Embodiment 2

With the exception that three parts of a alumina (mean major axis diameter: 0.18 μm) were added to the backcoat layer composition, this embodiment was prepared in the same manner as Embodiment 1.

Embodiment 3

With the exception that the type of carbon in the backcoat layer was changed (see-Table 2), this embodiment was prepared in the same manner as Embodiment 1.

COMPARATIVE EXAMPLES 1 AND 2

With the exception that the types of carbon black and hematite in the backcoat layer were changed (see Table 2), these comparative examples were prepared in the same manner as in Embodiment 1.

The results of Table 2 reveal that the magnetic tapes of Embodiments, relative to the magnetic tapes of Comparative Examples, had a lower backcoat layer surface roughness (Ra) and were thus smoother, as well as having lower coefficients of friction with good running stability and running durability. The magnetic tapes of Embodiments, relative to the magnetic tapes of Comparative Examples, had lower coefficients of friction and exhibited no precipitate after storage at high temperature and high humidity, indicating good storage properties. Since the magnetic recording medium of the present invention was smooth and exhibited little grime, dropout due to particle desorption and the like was thought to be low, rendering this medium suitable for use not only with conventional inductive heads, but also with MR heads requiring low noise.

The present invention provides a magnetic recording medium making it possible to control transfer of the backcoat layer to the surface of the magnetic layer, reduce dropout even when microgranular magnetic materials are employed, and simultaneously achieve good running stability, durability, and storage properties.

The present disclosure relates to the subject matter contained in Japanese Patent Application No. 2003-110456 filed on Apr. 15, 2003, which is expressly incorporated herein by reference in its entirety.

What is claimed is:

1. A magnetic recording medium comprising a magnetic layer comprising a ferromagnetic powder and a binder on one surface of a nonmagnetic support and a backcoat layer comprising a nonmagnetic powder and a binder on the other surface of the nonmagnetic support, wherein
said nonmagnetic powder is an acicular particle having a mean particle diameter ranging from 5 to 300 nm, and
said backcoat layer comprises water-soluble cations in a quantity equal to or less than 100 ppm and water-soluble anions in a quantity equal to or less than 150 ppm.

2. The magnetic recording medium according to claim 1, wherein said water-soluble cation is at least one selected from the group consisting of $Na^+$, $K^+$, $Ca^{2+}$, $Mg^{2+}$, and $NH_4^+$.

3. The magnetic recording medium according to claim 1, wherein said water-soluble anion is at least one selected from the group consisting of $N^-$, $Cl^-$, $NO_2^-$, $NO_3^-$, $SO_4^{2-}$, and $PO_4^{3-}$.

4. The magnetic recording medium according to claim 1, wherein said acicular particle is an oxide.

5. The magnetic recording medium according to claim 1, wherein said backcoat layer comprises a fatty acid and/or a fatty acid ester and/or a fatty acid amide in a quantity of 5

TABLE 2

| | Backcoat layer | | | Surface roughness of backcoat layer | μ | | μ after storage | |
|---|---|---|---|---|---|---|---|---|
| | Acicular particle | Carbon black | Alumina | (nm) | 1 P | 100 P | 1 P | 100 P |
| Embodiment 1 | Hematite 1 | Carbon black 2 | None | 3.6 | 0.21 | 0.23 | 0.21 | 0.25 |
| Embodiment 2 | Hematite 1 | Carbon black 2 | Alumina 1 | 3.9 | 0.20 | 0.23 | 0.22 | 0.25 |
| Embodiment 3 | Hematite 1 | Carbon black 1 | None | 3.5 | 0.20 | 0.23 | 0.21 | 0.26 |
| Comp. Ex. 1 | Hematite 2 | Carbon black 4 | None | 4.7 | 0.26 | 0.27 | 0.30 | 0.33 |
| Comp. Ex. 2 | Hematite 2 | Carbon black 3 | None | 4.4 | 0.25 | 0.27 | 0.27 | 0.31 |

| | | Water-soluble cation (ppm) | | | | | | Water-soluble anion (ppm) | | | | | | Total of anions (ppm) |
|---|---|---|---|---|---|---|---|---|---|---|---|---|---|---|
| | Precipitate after storage | $Na^+$ (nm) | $NH_4^+$ | $K^+$ | $Mg^{2+}$ | $Ca^{2+}$ | Total of cations (ppm) | $Cl^-$ | $NO^{2-}$ | $Br^-$ | $NO_3^-$ | $PO_4^{3-}$ | $SO_4^{2-}$ | |
| Embodiment 1 | o | 25 | 1 | 19 | 1 | 1 | 47 | 11 | 0 | 0 | 0 | 63 | 10 | 84 |
| Embodiment 2 | o | 28 | 1 | 24 | 2 | 1 | 56 | 12 | 0 | 0 | 0 | 66 | 14 | 92 |
| Embodiment 3 | o | 24 | 1 | 9 | 0 | 1 | 35 | 9 | 0 | 0 | 0 | 61 | 7 | 77 |
| Comp. Ex. 1 | x | 189 | 7 | 70 | 31 | 63 | 360 | 51 | 0 | 0 | 3 | 62 | 272 | 388 |
| Comp. Ex. 2 | Δ | 177 | 6 | 36 | 2 | 6 | 227 | 17 | 0 | 0 | 1 | 61 | 118 | 197 | weight percent or less, and said fatty acid, fatty acid ester, and fatty acid amide respectively have carbon atoms ranging from 10 to 26.

6. The magnetic recording medium according to claim 1, wherein said backcoat layer has a thickness ranging from 0.1 to 0.7 μm.

7. The magnetic recording medium according to claim 1, wherein the density of protrusions having a height measured by an atomic force microscope of 50 to 100 nm is equal to or less than 1,000 per 90 μm×90 μm area on the backcoat layer surface.

8. The magnetic recording medium according to claim 1, wherein said backcoat layer further comprises carbon black.

9. The magnetic recording medium according to claim 8, wherein said backcoat layer comprises the acicular particle and carbon black at a weight ratio (acicular particle:carbon black) of 60:40 to 90:10.

10. The magnetic recording medium according to claim 8, wherein said backcoat layer comprise the binder in a quantity ranging from 10 to 40 weight parts per 100 weight parts of a total weight of the acicular particle and carbon black.

* * * * *